Feb. 10, 1931.  M. KLINGER  1,792,429
DENTAL FLOSS HOLDER
Filed Aug. 2, 1929
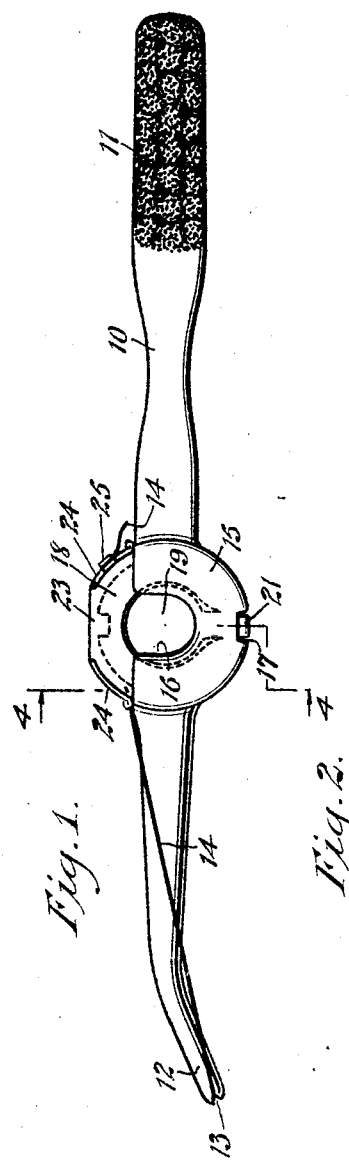
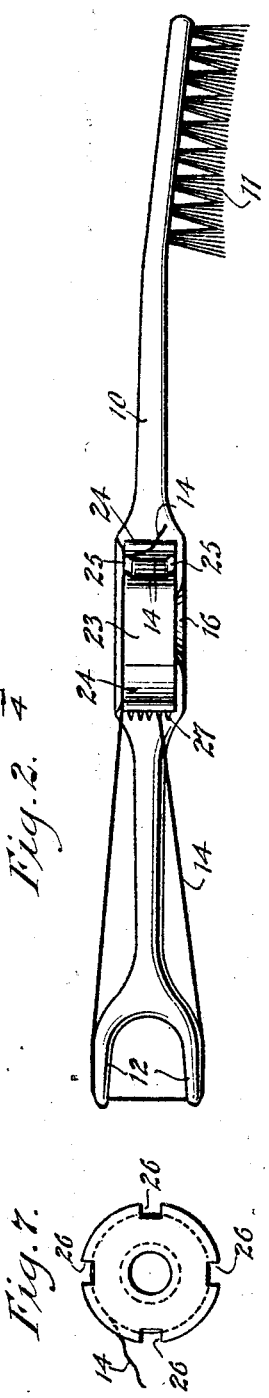
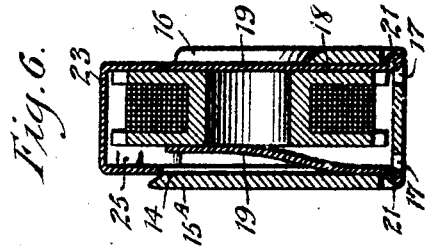
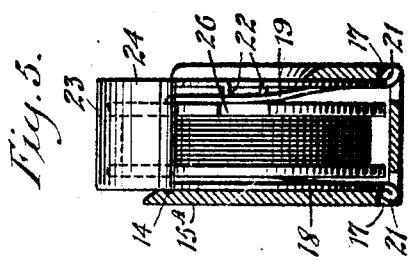
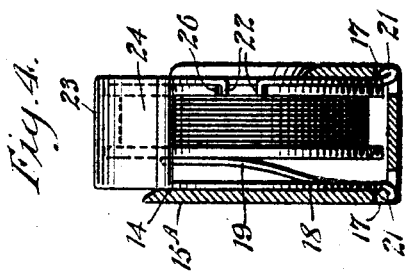
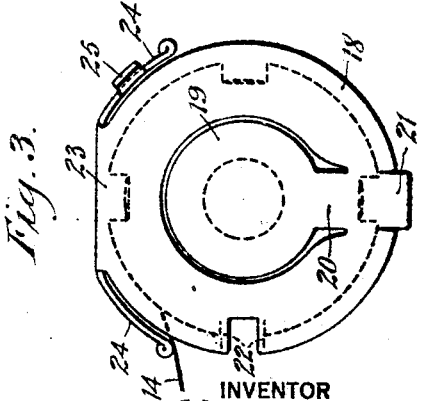
WITNESSES
INVENTOR
Max Klinger
BY
ATTORNEY Patented Feb. 10, 1931

1,792,429

UNITED STATES PATENT OFFICE

MAX KLINGER, OF BROOKLYN, NEW YORK

DENTAL FLOSS HOLDER

Application filed August 2, 1929. Serial No. 383,022.

This invention relates to dental floss holders.

It is among the objects of the present invention to provide a novel and improved dental floss holder which is simple in construction and operation and readily designed to meet the demands of economic manufacture.

A further object of the present invention is to provide a novel and improved combination of tooth brush and dental floss holder.

A further object of the present invention is to provide in combination with a tooth brush handle, means for receiving a dental floss holder, and means for stretching the floss across spaced furcations of the handle to provide facility in using the same.

A further object of the present invention is to provide an additional floss holder which will permit only a predetermined amount of discharge of floss from the floss holding spool.

A further object of the present invention is to provide a removable floss holding spool, together with means for permitting for moving the spool to permit a predetermined amount of rotation thereof.

Other objects of the present invention include the combination and interrelation of parts, whereby a novel and improved device of the character described is provided for.

Other objects of the present invention will be apparent from a consideration of the following specification taken in conjunction with the accompanying drawings, in which Figure 1 is a top plan view of one form of the present invention;

Fig. 2 is a side elevation of that form of the invention shown in Fig. 1;

Fig. 3 is a detail view of the floss spool holder;

Fig. 4 is a sectional view taken on lines 4—4 of Fig. 1, showing the spool and spool carrier in perspective;

Fig. 5 is a similar view to Fig. 4, showing the spool moved to permit rotation thereof;

Fig. 6 is a similar view to Fig. 4, showing the spool and spool carrier in full section;

Fig. 7 is a detail view of the dental floss spool.

Referring more particularly to the drawings, the present invention includes a tooth brush body 10, one end of which is provided with a conventional tooth brush head 11, while the opposite end is provided with a pair of angularly disposed furcations 12, the terminals of which are recessed as at 13 to provide for the stretching therebetween of dental floss or the like indicated by the numeral 14. Intermediate the ends of the body 10, the body is provided with a recessed enlargement 15 which provides a pocket lying in the plane of the handle. One face of the pocket is cut away as at 16, to provide a finger aperture, the function of which will be hereinafter described. The upper side of the recessed face of the pocket is cut away to lie in a line with one side of the body 10, as seen in Fig. 1, while the opposite face 15a, extends beyond the side of the body 10. The lower side of the pocket, as seen in Fig. 1, extends below the opposite side of the body 10 in half-round formation and is apertured as at 17, to receive securing elements as will be hereinafter described. Removably positioned within the pocket, there is provided a spool holder including a pair of similar side members 18, each of which is substantially round and includes a central cutout portion 19 joined to the edge by a tongue 20. Each of the sides 18 also includes depending engaging ears 21 which are adapted to be received through the apertures 17 to lock the spool holder within the pocket. The side 18 of the spool holder which lies adjacent the apertured face of the pocket, is provided with inwardly extending lugs 22 and the central portion 19 of the opposite side is bent to normally extend inwardly to urge the spool into engagement with the lugs 22. The spool holder is completed by the provision of an integral upper joining portion 23, which has oppositely extending cover elements 24 which cover the pocket and the spool therein to prevent movement of the spool therefrom. The cover element 24 is provided with extending lugs 25 over which the free end of the dental floss may be wound.

Referring more particularly to Fig. 7, the dental floss spool is of conventional formation but includes in addition thereto, one or more series of recesses 26 in the side flanges thereof, which recesses are adapted to be engaged by the lugs 22 when the spool is urged toward the apertured side of the pocket by the opposite central spring member 19 of the spool holder. For releasing the spool from the lugs 22, the central portion 19 of the side of the holder adjacent thereto may be moved inwardly as shown in Fig. 5, whereby the spool is moved away from the apertured side of the pocket and is free to rotate until removal of the finger from the recess, at which time the opposite central portion 19 will move the spool to the position shown in Figs. 4 and 6, and upon completion of a predetermined revolution, the recesses 26 will again engage the lugs 22 to prevent further rotation of the spool.

For guiding the dental floss from the spool to the furcations 12, the upper side of the pocket is provided with a plurality of guiding notches 27, over which the floss passes and goes to the furcations 12, and therefrom back to the pocket where it is received between the spool holder and the extended face 15a, the co-operation of which provides for maintaining proper tension upon the floss. The free end of the floss is wound about the projections 25 from which it may be conveniently broken off.

In the operation of the device, it will be seen that the finger is extended through the recess 16, whereby the spool is moved to the position shown in Fig. 5. The floss is then unwound from the spool which freely rotates within the spool holder and is passed across the furcations 12 and received in their depressions 13. When additional floss is required, a simple pressure through the aperture 16 permits predetermined rotation of the spool which will automatically be stopped when pressure is removed from the aperture 16 and when the spool has rotated the predetermined amount.

For inserting or removing a spool from the spool holder, it will be seen that the holder may be readily removed from the body in view of the frictional engagement of the elements 21 through the apertures 17, which elements provide for holding the spool holder against accidental displacement but permit intentional displacement.

From the foregoing it will readily be seen that the present invention provides a novel, simple and improved dental floss holder, which is arranged to conveniently govern the discharge of dental floss from the spool and which provides for the novel combination of a tooth brush with a dental floss holder. It will be understood that the present invention is disclosed only in one of its forms, and that numerous changes, modifications and the full use of equivalents may be resorted to without departing from the spirit or scope of the invention as outlined in the appended claims.

What is claimed is:

1. A device of the character described, a tooth brush including a handle body having a bifurcated end to receive therethrough dental floss, and means intermediate the ends of the handle for holding a spool of floss, said means being removably secured within a recess formed in the handle body, and including lugs for stopping the rotation of said spool.

2. A dental floss holder, including a rotatable spool, stationary side members, one of which members is provided with projecting lugs adapted to engage said spool to prevent the rotation thereof within said holder, and a resilient member carried by said side member having said lugs, said resilient member acting to move the spool away from said lugs.

3. A dental floss holder, including side members, one of said members being provided with projecting lugs adapted to engage a spool to prevent the rotation thereof within said holder, said side member being further provided with a resiliently formed portion adapted to move the spool away from the lugs, the opposite side member being provided with a resilient portion adapted to urge the spool toward the lugs.

4. A dental floss holder, including side members, one of said members being provided with projecting lugs adapted to engage a spool to prevent the rotation thereof within said holder, said side member being further provided with a resiliently formed portion adapted to move the spool away from the lugs, the opposite side member being provided with a resilient portion adapted to urge the spool toward the lugs, said side members being provided with extending engaging elements adapted to secure the holder within a suitable body.

5. A dental floss holder, including side members, one of which members is provided with projecting lugs adapted to engage a spool to prevent the rotation thereof within said holder, said side member being further provided with a resiliently formed portion adapted to move the spool away from the lugs, the opposite side member being provided with a resilient portion adapted to urge the spool toward the lugs, said side members being provided with extending engaging elements adapted to secure the holder within a suitable body, said side members being joined by a cover member for a receiving apertured body.

Signed at Brooklyn, in the county of Kings and State of New York, this 30th day of July, A. D. 1929.

MAX KLINGER.